(12) United States Patent
Leitao

(10) Patent No.: US 8,731,320 B2
(45) Date of Patent: May 20, 2014

(54) IMAGE PROCESSING USING A BILATERAL GRID

(76) Inventor: Andre Leitao, Den Bosch (NL)

( * ) Notice: Subject to any disclaimer, the term of this patent is extended or adjusted under 35 U.S.C. 154(b) by 473 days.

(21) Appl. No.: 13/145,504

(22) PCT Filed: Jan. 20, 2010

(86) PCT No.: PCT/IB2010/050251
§ 371 (c)(1),
(2), (4) Date: Aug. 24, 2011

(87) PCT Pub. No.: WO2010/084460
PCT Pub. Date: Jul. 29, 2010

(65) Prior Publication Data
US 2011/0299769 A1  Dec. 8, 2011

(30) Foreign Application Priority Data

Jan. 20, 2009  (EP) .................................... 09100053

(51) Int. Cl.
*G06K 9/40* (2006.01)

(52) U.S. Cl.
USPC ........... 382/260; 382/254; 382/261; 382/266; 345/419

(58) Field of Classification Search
None
See application file for complete search history.

(56) References Cited

U.S. PATENT DOCUMENTS

2011/0210969 A1* 9/2011 Barenbrug .................... 345/419
2011/0310116 A1* 12/2011 Muijs ............................ 345/617

OTHER PUBLICATIONS

Paris et al. "A Gentle Introduction to Bilateral Filtering and its Applications", 2007, ACM SIGGRAPH.*
Chen et al., "Real-time edge-aware image processing with the bilateral grid", ACM Transactions on Graphics (TOG), vol. 26, 2007.
Viola et al., "Rapid object detection using a boosted cascade of simple features", Proc. CVPR, vol. 1, 2001, pp. 511-518.
Porikli et al., "Constant Time 0(1) Bilateral Filtering", Computer Vision and Pattern Recognition, 2008. IEEE Conference on, IEEE, Piscataway, NJ, USA, Jun. 2008, pp. 1-8, XP031297401, ISBN: 978-1-4244-2242-5.
Porikli et al., "Integral Histogram: A Fast Way to Extract Histograms in Cartesian Spaces", Computer Vision and Pattern Recognition, 2005 IEEE Computer Society Conference on, IEEE, Piscataway, NJ, USA, vol. 1, Jun. 2005, pp. 829-836, XP010817358, ISBN: 978-0-7695-2372-9.
Weiss, "Fast Median and Bilateral Filtering", ACM Transactions on Graphics ACM USA, vol. 25, No. 3, Jul. 2006, pp. 519-526, XP009131832, ISSN: 0730-0301.
Aurich et al., "Non-linear gaussian filters performing edge preserving diffusion", Informatik Aktuell, pp. 538-545, 1995.
Crow et al., "Summed-area tables for texture mapping", Proceedings of the 11th annual conference on Computer graphics and interactive techniques, pp. 207-212, 1984.

(Continued)

*Primary Examiner* — Matthew Bella
*Assistant Examiner* — Jason Heidemann

(57) ABSTRACT

A method of processing a digital image. The method comprises: populating (100) a bilateral grid (10) comprising a plurality of cells (20), based on information obtained from the image, each cell comprising at least one value; then cumulatively integrating (110) the at least one value over the bilateral grid to form an integrated grid comprising integrated values; generating (120) a modified bilateral grid, comprising computing the sum of the at least one value over a predetermined rectangular box of cells of the bilateral grid, by using the integrated values corresponding to the corners of the box; and slicing (130) the modified bilateral grid to generate an output image.

10 Claims, 5 Drawing Sheets

(56) References Cited

OTHER PUBLICATIONS

Durand et al., "Fast bilateral filtering for the display of high-dynamic-range images", Proceedings of the 29th annual conference on Computer graphics and interactive techniques, pp. 257-266, 2002.

Eisemann et al., "Flash Photography Enhancement via Intrinsic Relighting", ACM, NY, USA, pp. 673-678, 2004.

Ke, "Efficient visual event detection using volumetric features", International Conference on Computer Vision, vol. 1, pp. 166-173, 2005.

Paris et al., "A fast approximation of the bilateral filter using a signal processing approach", Proceedings of the European Conference on Computer Vision, 2006.

Petschnigg et al., "Digital Photography with Flash and No-Flash Image Pairs", ACM, NY, USA, pp. 664-672, 2004.

Pham et al., "Separable bilateral filtering for fast video preprocessing", Multimedia and Expo, 2005. ICME 2005. IEEE International Conference on, pp. 454-457, 2005.

Rau et al., "Efficient approximation of gaussian filters", Signal Processing, IEEE Transactions on [see also Acoustics, Speech, and Signal Processing, IEEE Transactions on], vol. 45, pp. 468-471, 1997.

Smith et al., "Susan—A New Approach to Low Level Image Processing", International Journal of Computer Vision, vol. 23, 1997, pp. 45-78.

Tomasi et al., "Bilateral filtering for gray and color images", Proceedings of the IEEE International Conference on Computer Vision, pp. 839-846, 1998.

\* cited by examiner

IMAGE PROCESSING USING A BILATERAL GRID

PRIORITY INFORMATION

This patent application claims priority from PCT patent application PCT/IB2010/050251 filed Jan. 20, 2010, which claims priority to EP patent application 09100053.9 filed Jan. 20, 2009, both of which are hereby incorporated by reference.

FIELD OF THE INVENTION

This invention relates to image processing and, more particularly, to image processing using a bilateral grid.

BACKGROUND OF THE INVENTION

Filtering is perhaps a fundamental operation of image processing and computer vision. In the most general sense of the term "filtering", the value of the filtered (output) image at a given location is a function of the values of the image function in a neighbourhood around the corresponding location in the input image. The image function may be an intensity variable or a colour vector, among other properties.

Low-pass filtering, for example, computes a weighted average of pixel values in a neighborhood. The weights, which determine the impulse response, distinguish the filter type. Typical applications of low-pass filtering are image smoothing and de-noising. The implicit assumption in these applications is that natural images usually have an image function whose value varies slowly over space, so that nearby pixels are likely to have similar values. Local deviations from this "smooth" function are likely to be noise. The noise values that "corrupt" the smooth pixel values exhibit lower mutual correlation than the signal values themselves; and the noise function is assumed to be a zero-mean process. So, by averaging the pixel values, the noise is removed, while the signal (the desired image function) is preserved. The assumption of slow spatial variation of the image function fails at edges, which are consequently blurred by linear low-pass filtering. To overcome this, nonlinear filters have been proposed, which allow edge-preserving filtering.

One example of non-linear edge-preserving filtering is the method of "bilateral filtering". In bilateral filtering, the influence of a given input pixel on the output depends not only on the position, but also on the value of that input pixel. A linear filter comprises a set of weights which depend only on the position of a pixel with respect to the centre of the neighborhood. By contrast, the weights in a bilateral filter take into account both the spatial deviation of an input pixel from the central location and the deviation in value from the central pixel. For example, a bilateral filter can be defined for an image I at position p as:

$$bf(I)_p = \frac{1}{W_p} \sum_{q \in N(p)} G_{\sigma_s}(\|p-q\|) G_{\sigma_r}(\|I_p - I_q\|) I_q$$

$$W_p = \sum_{q \in N(p)} G_{\sigma_s}(\|p-q\|) G_{\sigma_r}(\|I_p - I_q\|)$$

This defines a weighted average over a neighborhood, where the weight is the product of a Gaussian $G_{\sigma_s}$ on the spatial distance and another Gaussian $G_{\sigma_r}$ on the pixel value difference. The latter is also known as the "range weight". The effectiveness of the bilateral filter in respecting strong edges comes from the inclusion of this range term in the weight. The range weight prevents pixels on opposite sides of an image edge from influencing one another, since, although such pixels are spatially close, they are remote in range (value).

In the publication by J. Chen, S. Paris and F. Durand, entitled "Real-time Edge-aware Image Processing with the Bilateral Grid", ACM Transactions on Graphics (TOG), vol. 26, 2007, a data structure called the "bilateral grid" was developed based on the principles of the bilateral filter. The bilateral grid proposed was a 3D array combining the two-dimensional spatial domain with a one-dimensional reference range dimension. Typically, the range axis is image-intensity. In such a three-dimensional space, the extra (intensity) dimension makes the Euclidean distance meaningful for edge-aware image manipulation. A bilateral grid is regularly sampled in each dimension. Thus, the grid may have lower resolution in both spatial domain and range than the original intensity image. Intuitively, the sampling rate of the spatial axes controls the amount of smoothing, while the sampling rate of the range axis controls the degree of edge preservation. The sampling gives rise to a structure corresponding to an array of cells or bins in three dimensions. Each pixel in the image is counted in one of the cells. The basic bilateral grid can then be defined by the following equations:

Initialization: for all (i, j, k)

$$\Gamma(i,j,k)=(0,0)$$

Filling: for all Pixel Positions (x, y)

$$\Gamma([x/s_s],[y/s_s],[I(x,y)/s_r])+=(I(x,y),1)$$

Here [●] is the closest integer (rounding) operation, while $s_s$ and $s_r$ are the sampling rates of the spatial axes and range axis, respectively. As can be seen from the foregoing equations, the creation of a bilateral grid involves promoting source data into a higher number of dimensions. In the current case, a two-dimensional image is promoted into three-dimensions. Note that the bilateral grid can be filled with any type of data such as scalars and vectors. For many operations on the grid, it is important to maintain information about the occupancy or weight of each grid cell. Here, occupancy refers to the number of input pixels accumulated in each cell. A homogenous-coordinate representation is a convenient way to accommodate this requirement. Thus, color vectors may be stored, for example, as (wR, wG, wB, w). The homogeneous coordinates lend themselves to calculations such as weighted averaging. To return to standard coordinates, the (weighted) colour-coordinates are divided (normalized) by the homogeneous coordinate, w.

To recover (extract) an image from the bilateral grid, a process known as "slicing" can be used. This is symmetrical with creation of the grid, in that, if a grid maintains the full resolution of an image, slicing will restore the original image exactly. To "slice" the bilateral grid using a reference image E, the grid is accessed, using tri-linear interpolation, as follows:

$$\Gamma(x/s_s, y/s_s, E(x,y)/s_r)$$

Note that implicit in this slicing operation is the conversion from homogeneous coordinates to standard coordinates (by dividing by the occupancy/weight value). The operations performed on the grid between its creation and slicing define the edge-aware image-processing. The particular operations to be performed will often indirectly determine the required grid sampling rates.

The description above, in which image intensity and cell occupancy are accumulated, represents just one example of a bilateral grid. Other uses and constructions are also possible.

Several of these are explored in the publication by J. Chen et al., as referenced above. For example, it is not essential that range information (such as intensity) is actually accumulated in the grid. Equally, it is possible that one image defines the range dimension in the grid, but properties of another image are actually accumulated in the cells. It is also possible to construct a grid in more than three dimensions, for example, having two spatial dimensions and two range dimensions. Higher dimensional grids are able to represent joint variations in a larger set of quantities or measurements.

In many practical applications the bilateral grid can be generated as a heavily sub-sampled representation. For example a 70×70×10 grid may be sufficient for an 8 megapixel image, in many cases. However, even with such a relatively low resolution, the computational requirements for typical processing operations on the grid are significant. In one sense, this is inevitable, due to the inherent expansion in the dimensionality of the underlying data. The complexity increases rapidly as the resolution in the multi-dimensional grid is increased or as operations are performed that use neighbourhoods of larger size.

SUMMARY OF THE INVENTION

According to an aspect of the invention, a method of processing a digital image, comprises populating a bilateral grid comprising a plurality of cells, based on information obtained from the image, each cell comprising at least one value; cumulatively integrating the at least one value over the bilateral grid to form an integrated grid comprising integrated values; and generating a modified bilateral grid, comprising computing the sum of the at least one value over a predetermined rectangular box of cells of the bilateral grid, by using the integrated values corresponding to the corners of the box.

The method provides a more efficient, and hence faster, way to perform operations which involve summations over grid cells. The bilateral grid can be constructed in the conventional way. The cell values are then integrated cumulatively over the grid (that is, the cumulative sum of the grid is calculated). In the resulting integrated grid, any given cell contains a cumulative sum of the cell values in a box having the origin at one corner and the given cell as the diagonally opposite corner. From this integrated grid, it is possible to efficiently compute a summation of cell values over an arbitrary (multi-dimensional) rectangular box. The calculation uses a small number of elements in the integrated array, the precise number being fixed by the dimensionality of the bilateral grid. Importantly, the complexity of the calculation is independent of the size of the region over which cell values are to be summed. In this way, a large number of summation operations of arbitrary size can be executed rapidly. Thus, the original grid can be manipulated more efficiently, by using calculations based on integrated values in the integrated grid. The manipulation of the grid produces a modified grid, which can then be sliced in the conventional manner, to produce an output image, or exploited in other ways (for example, for feature-extraction).

The method may further comprise slicing the modified bilateral grid to generate an output image.

Slicing the modified grid allows useful image-processing operations, such as edge-aware image-smoothing, to be carried out. With this extra step, the method takes an input image and processes it using the bilateral grid to generate a modified output image.

The at least one cell value may comprise a first cell value representing the frequency of occurrence of pixels in the digital image which fall in a predetermined interval of a spatial variable and a range variable.

In this case, the bilateral grid represents a joint, multi-dimensional histogram.

The at least one cell value may further comprise a second cell value representing a sum of a pixel variable over each pixel in the digital image which falls in the predetermined interval.

The pixel variable may be one of: an image intensity variable; and an image color variable.

The range variable may be one of: an intensity variable; a color variable; an edge variable; a noise variable; a contrast variable; a standard deviation variable; and a sharpness variable.

The range variable is the basis for the range dimension in the bilateral grid. It may be one of a number of variables which are of interest for the purposes of image processing. The inclusion of a particular variable as a range variable in the grid makes the subsequent processing implicitly aware of differences in that variable. For example, when intensity is used as a range variable, the processing is implicitly sensitive to differences in intensity, such as image edges. The set given above is a non-exhaustive list of examples of variables which may be advantageous to consider in non-linear image processing operations; hence, such variables may be advantageously employed as a range variable in a bilateral grid. Note that a range variable may or may not be measured by the cell values in the grid.

The predetermined interval may be an interval of a spatial variable and at least two range variables.

Including two (or more) range variables enables more sophisticated image processing, since the bilateral grid encodes joint variations in both (or all) variables. This results in a further increase in the dimensionality of the data and/or data structures. In turn, this addition of extra dimensions to the bilateral grid increases complexity. In these circumstances, the approach of integrating the grid may be particularly important to achieve a computationally efficient, practically realisable image processing solution.

The step of generating the modified bilateral grid may comprise computing the sum of the at least one value over two or more predetermined rectangular boxes of cells, having different sizes and/or positions in the grid.

The advantages of the integrated grid become more pronounced as a greater number of different summations are calculated. This is because the integrated grid represents an efficient pre-computation of useful values. Once the integrated grid has been produced, the subsequent computational cost of each summation is very low. The cost is also independent of the size of the region over which the summation is computed. This means that the method is particularly beneficial and well-suited to multi-scale implementations in which summations are calculated over a range of box-sizes as well as box-positions in the grid. The combination of summations over different box-sizes may also be used to approximate more advanced processing. For example, a more complicated filter function may be approximated by two or more summations at different scales. This can be considered, for example, as approximation of the filter by a sum of box-filters of varying support.

According to another aspect of the invention, there is provided a method of filtering a digital image, comprising the method described above.

A variety of image filtering operations can be beneficially implemented using the methods of the present invention. These methods may be particularly beneficial for implementing non-linear image filtering. For example, the methods can be deployed in edge-preserving smoothing, among other applications.

The method of filtering a digital image may comprise iterative application of the steps of cumulatively integrating the at least one value over the bilateral grid; and generating a modified bilateral grid, as described above.

The present invention can provide faster, more efficient processing using summations over rectangular boxes. More complex image processing functions can also be approximated as a superposition of operations, wherein recursive application of the simple but efficient box-summation is used to synthesise more complicated kernels.

According to a further aspect of the present invention, there is provided a computer program comprising computer program code adapted to perform all the steps of any of the methods described above when the program is executed on a computer.

The computer program may be embodied on a computer readable medium.

According to yet another aspect of the invention, there is provided an apparatus adapted to process a digital image, comprising: a memory, adapted to store a bilateral grid comprising a plurality of cells, each cell comprising at least one value; and a processor, adapted to (i) populate the bilateral grid based on information obtained from the image (ii) cumulatively integrate the at least one value over the bilateral grid to form an integrated grid comprising integrated values; and (iii) generate a modified bilateral grid, comprising computing the sum of the at least one value over a predetermined rectangular box of cells of the bilateral grid, by using the integrated values corresponding to the corners of the box.

These and other objects, features and advantages of the present invention will become more apparent in light of the following detailed description of preferred embodiments thereof, as illustrated in the accompanying drawings.

BRIEF DESCRIPTION OF THE DRAWINGS

The invention will now be described by way of example with reference to the accompanying drawings, in which.

DETAILED DESCRIPTION OF THE INVENTION

The present inventors have recognized that the speed of typical operations on a bilateral grid can be increased through the use of an integrated grid representation. The integrated grid represents an additional intermediate stage, when compared with known processing approaches on the bilateral grid.

As already outlined above, the bilateral grid is a very useful construct for supporting various non-linear image-processing operations. By way of example, the following description will focus on edge-preserving smoothing, with reference to intensity images. In this case, the range variable of interest is the intensity of the input image. However, as will be apparent to one skilled in the art, the utility of the present invention is not limited to such an application.

Figure 1A:
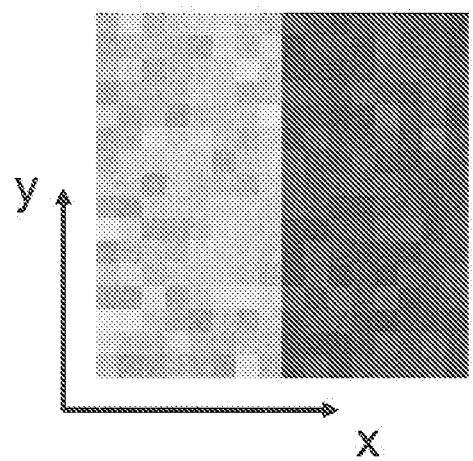
FIG. 1A shows an intensity edge in a two-dimensional image.
Figure 1B:
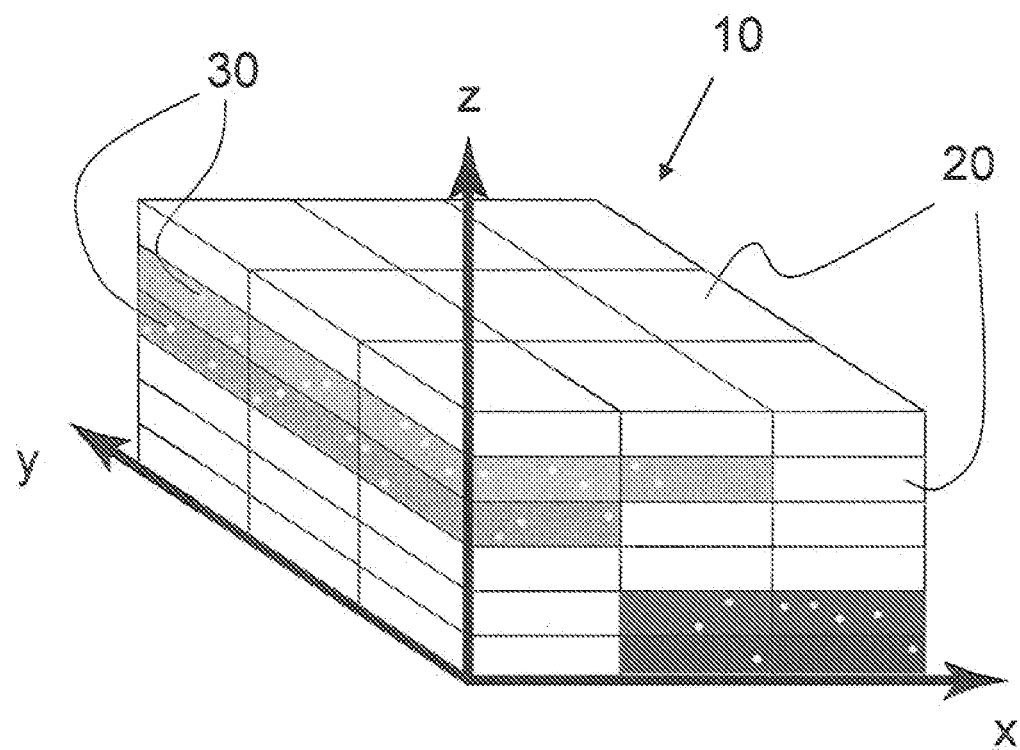
FIG. 1B illustrates how a bilateral grid might be constructed from the image information of FIG. 1A.

FIG. 1A shows an example of an image containing an intensity edge. The bilateral grid enables edge-aware processing of this image by promoting the two-dimensional (2D) intensity image into a 3D volume. The intensity image is treated as a 2D surface embedded in a higher-dimensional space. The three dimensions are the existing two spatial dimensions, plus intensity. FIG. 1B shows how the 2D image of FIG. 1A might be represented in a bilateral grid 10. The grid 10 comprises an array of bins or cells 20, which tessellate the 3D space. Each cell 20 represents a particular interval in each of the three dimensions. Thus, the grid is a jointly sampled representation of the volume. Each pixel of the image falls into a cell 20. The counting or accumulation of the pixels is indicated by the white dots 30 in FIG. 1B.

Each cell in the bilateral grid can include one or more values that are accumulated over all the pixels falling in the cell. In the case of edge-preserving smoothing, two values are stored, and the grid is filled from the input image I(x, y) as follows:

$$\Gamma([x/s_s],[y/s_s],[I(x,y)/s_r])+=I(x,y)$$

$$\Gamma_N([x/s_s],[y/s_s],[I(x,y)/s_r])+=1$$

This is just the normal bilateral grid implementation, separating the homogenous coordinates into two explicit equations. Thus, $\Gamma_N$ is used to count the number of pixels in each grid cell, while $\Gamma$ accumulates the sum of the intensity values of the same pixels.

The actual smoothing operation is carried out using this filled grid representation. A filter kernel is defined in 3D, by defining weights which vary in both the spatial domain and intensity (the range variable). As for standard, linear image processing, the choice of kernel determines the type of processing. For a smoothing operation a box filter may be a simple but appropriate choice of kernel. A box filter is simply a uniform kernel of finite support in N-dimensions. The current inventors have recognized that the simplicity of the box filter can enable significant acceleration of the computation of a filtered grid. This acceleration is possible because the box filter amounts to a summation over a finite range of cells in the grid. The inventors have devised an efficient way of implementing this summation.

The efficient implementation of the box filter in the bilateral grid relies on an extension of the method of "integral images". Rectangular two-dimensional image features can be computed rapidly using an intermediate representation called the integral image. This strategy has been described, for example, by P. Viola and M. Jones, "*Rapid object detection using a boosted cascade of simple features*", Proc. CVPR, vol. 1, 2001, pp. 511-518.

The integral image is an image containing accumulated sums of pixel values taken from an input image. Conveniently, from only four values of the integral image, the sum of original image values in any rectangular region can be computed efficiently. This offers economic implementations of several computer vision and image processing algorithms based on box filters.

The concept of the integral image will now be explained, with reference to FIG. 2. L1, L2, L3 and L4 are the vertices of a rectangle over which it is desired to integrate some function. From inspection of the geometry, it can be seen that the area of this rectangle can be expressed in terms of the areas of four other rectangles, each with one vertex at the origin (0, 0) and the other vertex at one of the four points, L1 to L4. Specifically, if the area of the largest rectangle (L1) is added to the smallest (L3) and the area of the other two rectangles (L2, L4) is subtracted, the remainder is exactly the area of the desired rectangle {L1, L2, L3, L4}. The same principle holds for the integral of any function of interest, over the same rectangles.

The "integral image" pre-calculates the integrals over the component rectangles, by cumulative integration of the image function. That is, for an image I(x,y), its integral image ii(x,y) is defined by:

$$ii(x, y) = \sum_{x' \leq x, y' \leq y} I(x', y')$$

Using the following pair of recurrence relations, the integral image can be computed with one pass over the original image:

$$s(x,y)=s(x,y-1)+i(x,y)$$

$$ii(x,y)=ii(x-1,y)+s(x,y)$$

Here, s(x, y) is the cumulative row sum. To initialize the recursive sum, set s(x,−1)=0=ii(−1,y).

Using the integral image, the sum (integral) of image values over an arbitrary rectangle can be computed with four array references and a simple set of arithmetic operations:

$$ii(L1)+ii(L3)-ii(L2)-ii(L4)$$

Note that the complexity of this formula does not depend on the size of the region of interest. Thus the integral image allows an arbitrary integral (over a rectangle) to be computed in constant time.

The present inventors have extended the concept of integral images to the three dimensional bilateral grid. In the same way that the integral image can be used to compute the integral of the image function in two dimensions, an integrated bilateral grid can be used to compute the box-filter sums in three or more dimensions in the grid. Similarly to an integral image, in the integrated grid, each cell contains the sum of the values in a rectangular box having that cell at its corner.

To compute the integrated grid in one pass, two intermediate variables and three recurrence relations can be used:

$$s1(x,y,z)=s1(x,y-1,z)+\Gamma(x,y,z)$$

$$s2(x,y,z)=s2(x-1,y,z)+s1(x,y,z)$$

$$ii(x,y,z)=ii(x,y,z-1)+s2(x,y,z)$$

The integrated grid is calculated for all cell values, that is, $\Gamma$ and $\Gamma_N$, in the current embodiment.
An alternative, but equivalent, recurrence relation is:

$$ii(x,y,z)=\Gamma(x,y,z)+ii(x-1,y,z)+ii(x,y-1,z)-ii(x-1,y,z)+ii(x,y,z-1)$$

Once the integrated bilateral grid has been produced, the integral (sum) of the cell values over a given three-dimensional rectangular box is obtained by eight references, to the corners of the rectangular box in the integrated grid:

$$\sum_{x=x_0}^{x_1} \sum_{y=y_0}^{y_1} \sum_{z=z_0}^{z_1} \Gamma(x, y, z) = L_1 - L_2 - L_4 + L_3 - (L_5 - L_6 - L_8 + L_7)$$

Figure 2:
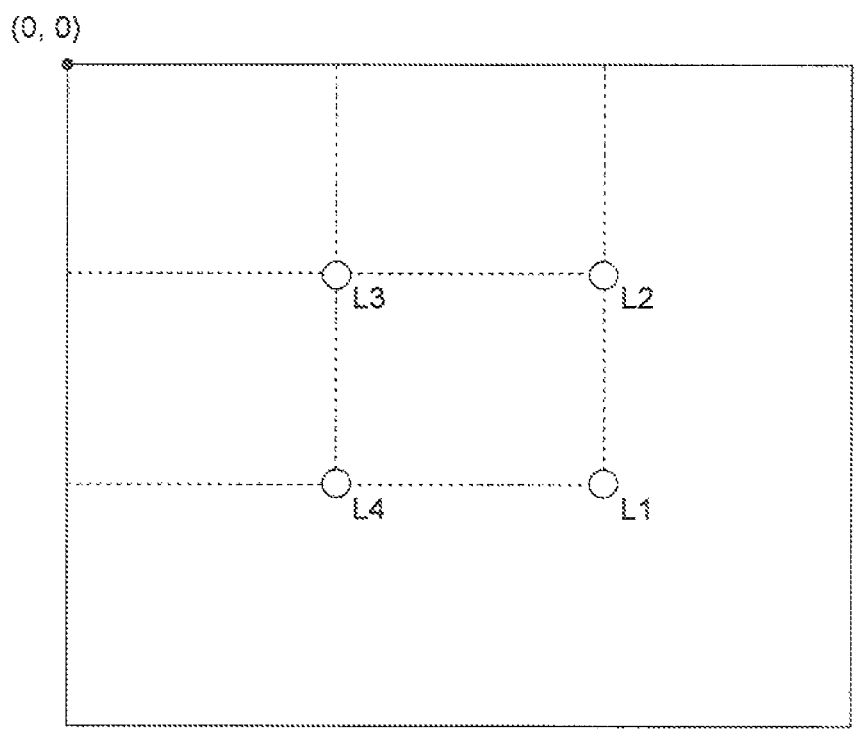
FIG. 2 shows how a summation over a rectangular area can be calculated using an integral image in two-dimensions.
Figure 3:
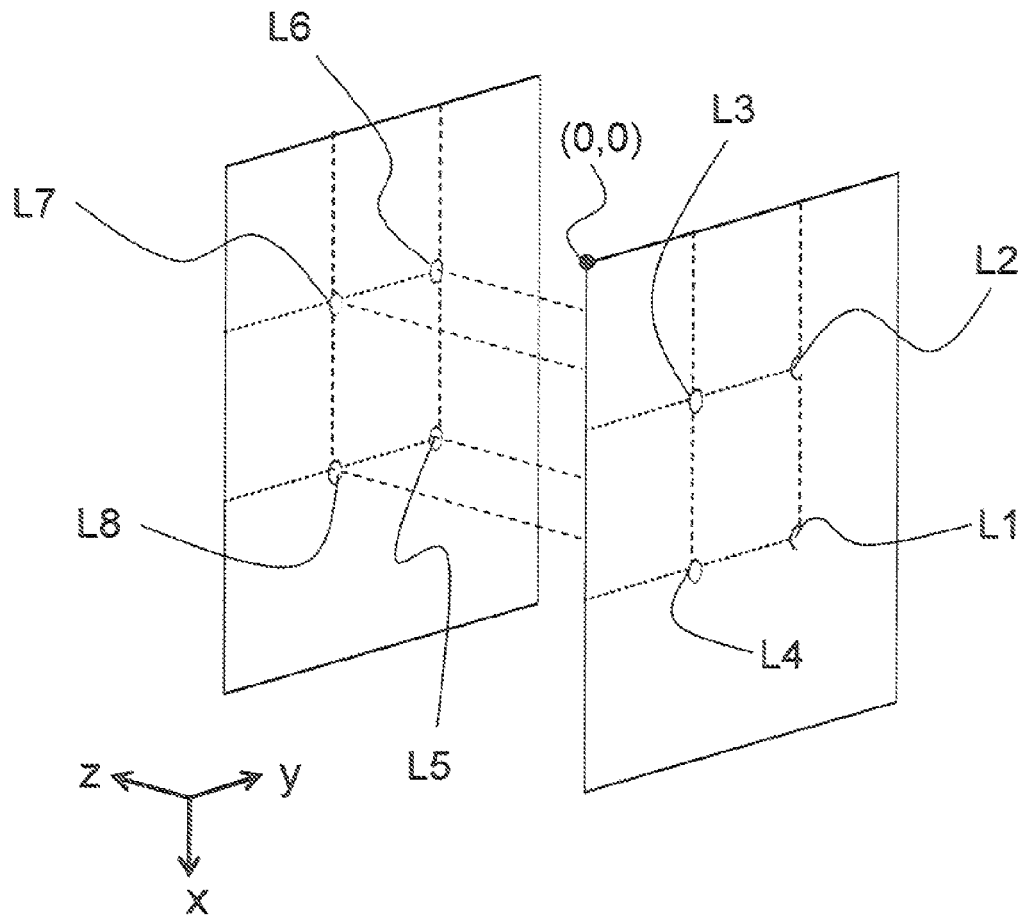
FIG. 3 shows how the concept of FIG. 2 can be extended to calculating a similar summation over a rectangular box in three dimensions.

This is illustrated in FIG. 3, which represents the extension of FIG. 2 into three dimensions. Note that, depending on the degree of sub-sampling in the grid and the requirements of the application, it is possible that the sum to be calculated will be over a box in just two dimensions or, indeed, along a line. As will be apparent to the skilled person, this has no impact on the method, and the sum will be calculated from the integrated grid in exactly the same way. Note that, in circumstances where the dimensionality and size of the box to be integrated are small in comparison with the dimensionality of the grid, the efficiency gain available from the use of the integrated grid may be reduced. In extreme cases it may be more efficient to compute the summation directly from the bilateral grid itself, in the known way.

Typically, in edge-preserving smoothing applications, the filtering is used to derive a modified bilateral grid. That is, the smoothed results of the box-filtering operation are entered in a new grid $\{\Gamma', \Gamma_N'\}$ which can then be sliced to produce the output image:

$$I'(x, y) = \frac{\Gamma'(x/s_s, y/s_s, I(x, y)/s_r)}{\Gamma_N'(x/s_s, y/s_s, I(x, y)/s_r)}$$

Here, the summed image values contained in the processed (smoothed) cells are divided by the corresponding summed occupancy values of those cells. This normalizes the output so that the output image represents a (non-linear) local average of the pixel values of the input image. As described above, the values in the grid can be accessed using tri-linear interpolation. Other interpolation methods may also be used.

Figure 4:
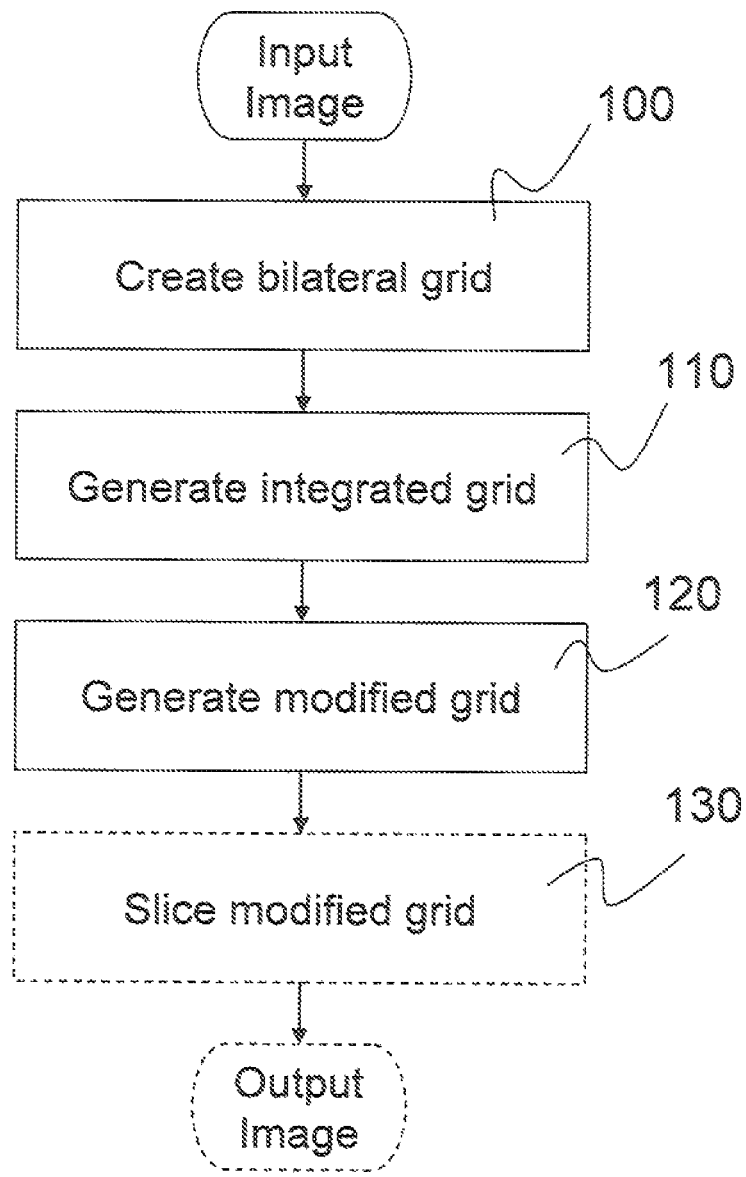
FIG. 4 is a flow-chart illustrating a method according to an embodiment of the invention.

A method according to an embodiment of the invention is now described, with reference to FIG. 4. At step 100, the input image is scanned and the pixel values accumulated, to populate the bilateral grid. The filling of the grid can be carried out by known methods, as described earlier above. At step 110, the filled bilateral grid is cumulatively integrated, to form an integrated grid. As already discussed above, the cells of the integrated grid represent incrementally summed values of the standard grid. From this integrated grid, summations over multi-dimensional rectangular boxes are easy to compute. At step 120, a modified (for example, filtered/smoothed) grid is generated based on the computation of box-summations using this approach. This modified grid is sliced, in step 130, to derive the processed output image. In the current embodiment, the processed output image is a non-linearly smoothed image, where the edges have been preserved through the operation of bilateral filtering. The step 130 of slicing the modified grid can be used in image-processing tasks (such as edge-preserving smoothing) to derive an output image. However, it is not essential in all embodiments of the invention. For example, in feature-extraction tasks, the goal may be to analyze the input image to produce features characterising the content of the image. In these circumstances, the modified bilateral grid can be used to calculate the features directly, in which case there is no need to slice to produce an "output image". Optional step 130 is indicated with a dashed box in FIG. 4.

Figure 5:
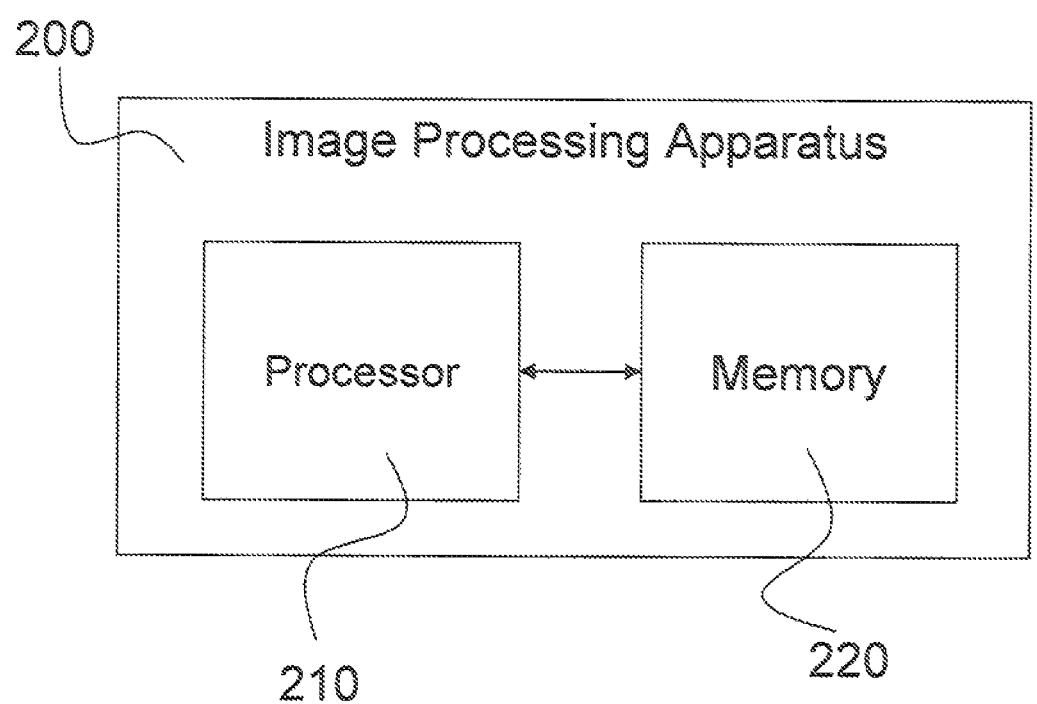
FIG. 5 is a block diagram of an apparatus according to another embodiment.

An image processing apparatus 200 according to an embodiment of the invention is shown in FIG. 5. The apparatus comprises a processor 210 for carrying out processing according to a method of the invention as described above, and a memory 220 for storing the bilateral grid and/or other data. As will be readily apparent to one skilled in the art, this apparatus may be embodied, for example, in a general purpose personal computer (PC) operating in accordance with the invention. Equally, the apparatus may comprise dedicated image processing hardware, for example, embedded in a digital (image or video) camera, or a camera phone, so as to provide on-board image processing functionality. When implemented in such dedicated hardware, the computational efficiency and speed advantages of the invention may be particularly useful, since they may allow image processing algorithms to be implemented on-line in real-time, where otherwise this would not have been possible.

While the invention has been illustrated and described in detail in the drawings and foregoing description, such illustration and description are to be considered illustrative or exemplary and not restrictive; the invention is not limited to the disclosed embodiments.

For example, it is possible to operate the invention in an embodiment wherein the bilateral grid and integrated bilateral grid are used to perform other image processing tasks (other than edge-preserving smoothing using a box filter).

As will be known to the skilled person, it is possible to implement more complex filter kernels by approximating them as a series of box filtering operations. One such approximation involves summing the results of box filters at different scales, to provide a piecewise-constant approximation to another filter kernel. The present invention lends itself particularly well to such an implementation, since large numbers of summations at different scales can be rapidly computed using the integrated bilateral grid. In fact, in general, embodiments of the invention may prove beneficial whenever multi-scale processing is called for.

Other approximations rely on successive application of box-filter kernels. As is well known in the context of linear image processing, careful selection of the support (area) and weight (amplitude) of a series of box filters can be used to approximate more advanced kernels. The successive application (convolution) produces the same effect as a filter kernel which is the product of the convolution of the individual box-filter kernels. This filter is typically smoother than the individual sharp-edged box-filter kernels. In the context of the current invention, successive application means that after the modified grid has been derived for the first box-filtering operation, this grid is itself cumulatively integrated, to enable the second box-filter to be applied. This is repeated for each iteration.

As is also well known, the bilateral grid can be used for a variety of other image-processing tasks, apart from smoothing. Accordingly, the present invention is not limited to smoothing applications. It may provide efficiency benefits in any circumstances where it is desired to integrate the cells in a bilateral grid. Note that it is not essential that the (modified) bilateral grid is sliced to produce an output image. In feature-extraction tasks, for example, the goal may be to compute features directly from the bilateral grid, rather than produce a modified output image. One example of a typical feature-extraction task is the computation of features for object-detection or object-recognition, for instance, in a method like the well-known face-detection algorithm of Viola and Jones (previously referenced, above).

As already described above, the cell values accumulated in the grid may relate to intensity information, color information or any other image parameters of interest.

Likewise, the range variable in the bilateral grid is not limited to intensity information. Intensity information provides an appropriate range-dimension when edge-aware processing is desired. Other variables will be appropriate to introduce awareness of other types of image feature. For instance, noise information may be set as a dimension in the bilateral grid, subsequent filtering will then be sensitive to differences in noise-level. Other examples may include standard deviation, color information or image quality metrics such as contrast, sharpness, or entropy.

The bilateral grid can also be extended beyond three dimensions. In theory there is no limit to the number of range variables which can be included in the representation. Of course, memory considerations may prove a practical limitation, since the size of array needed to store the bilateral grid can expand rapidly with the addition of further dimensions. The inclusion of multiple range variables in a higher-dimensional "multi-lateral" grid enables the modelling of joint variations in the range variables. Once again, these joint variations are captured by the Euclidean distance in the multi-dimensional space, so that they are considered implicitly in any filtering operation. As will be apparent to the skilled person, the equations for computing the integrated grid and the equation for computing an area integral using the integrated grid must be extended for use in N-dimensions. Such development will be well within the abilities of one skilled in the art. The number of array references and arithmetic operations will increase with increasing dimensionality. However, the low complexity of the present invention can still be observed, as the cost of computing a summation over an N-dimensional box will be constant for a given number of dimensions, N—that is, the complexity remains constant independently of the size and position of the box being summed For example, a four-dimensional grid may be created with two spatial dimensions and two range dimensions. The two range dimensions may be image intensity and noise information. This grid may be subject to a box-filtering process in 4D, so as to allow processing that is aware of noise as well as intensity.

Note also that it is not essential that two spatial dimensions are represented in the bilateral grid. For example, one spatial dimension in a two dimensional image could be sub-sampled into just one bin—effectively eliminating that dimension from the bilateral grid. In this case, the bilateral grid will have at least two dimensions, one remaining spatial dimension and at least one range dimension.

Other variations to the disclosed embodiments can be understood and effected by those skilled in the art in practicing the claimed invention, from a study of the drawings; the disclosure; and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope. Any reference in the specification or claims to an "image" should be construed as including the possibility that the image in question is, for example, a frame in a video sequence.

What is claimed is:

1. A method of processing a digital image, comprising:
populating a bilateral grid comprising a plurality of cells, based on information obtained from the image, each cell comprising at least one value;
cumulatively integrating the at least one value over the bilateral grid to form an integrated grid comprising integrated values; and
generating a modified bilateral grid, comprising computing the sum of the at least one value over a predetermined rectangular box of cells of the bilateral grid, by using the integrated values corresponding to the corners of the box.

2. The method of claim 1, further comprising slicing the modified bilateral grid to generate an output image.

3. The method of claim 2, wherein the step of generating the modified bilateral grid comprises computing the sum of the at least one value over two or more predetermined rectangular boxes of cells, having different sizes and/or positions in the grid.

4. The method of claim 3, comprising iterative application of the steps of cumulatively integrating the at least one value over the bilateral grid; and generating a modified bilateral grid.

5. The method of claim 1, wherein the at least one cell value comprises a first cell value representing the frequency of occurrence of pixels in the digital image which fall in a predetermined interval of a spatial variable and a range variable.

6. The method of claim 5 wherein the at least one cell value further comprises a second cell value representing a sum of a pixel variable over each pixel in the digital image which falls in the predetermined interval.

7. The method of claim 6 wherein the pixel variable is one of:

an image intensity variable; and an image color variable.

8. The method of any of claims 5, wherein the range variable is one of:

an intensity variable;

a color variable;

an edge variable;

a noise variable;

a contrast variable;

a standard deviation variable; and a sharpness variable.

9. The method of any of claims 5, wherein the predetermined interval is an interval of a spatial variable and at least two range variables.

10. An apparatus that processes a digital image, comprising:

a memory adapted to store a bilateral grid comprising a plurality of cells, each cell comprising at least one value; and a processor, adapted to populate the bilateral grid based on information obtained from the image;

cumulatively integrate the at least one value over the bilateral grid to form an integrated grid comprising integrated values; and generate a modified bilateral grid, comprising computing the sum of the at least one value over a predetermined rectangular box of cells of the bilateral grid, by using the integrated values corresponding to the corners of the box.

* * * * *